G. W. THOMAS.
PITCHER OR DISPENSING VESSEL.
APPLICATION FILED NOV. 9, 1916.
1,279,787.
Patented Sept. 24, 1918.
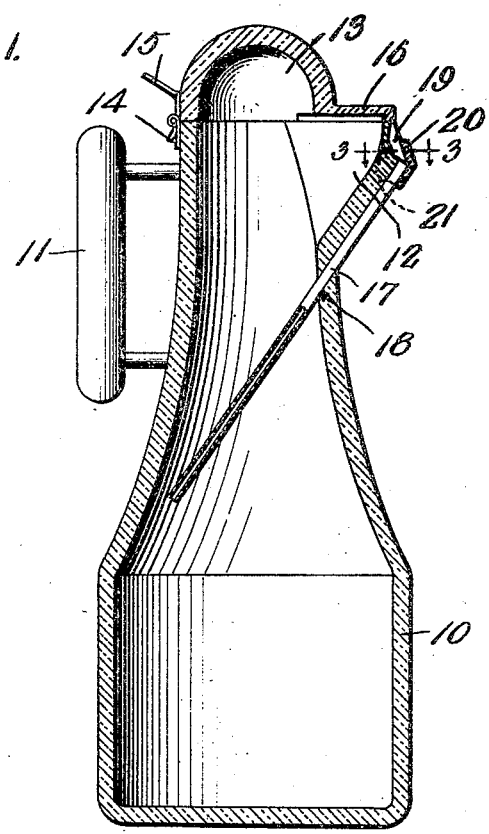
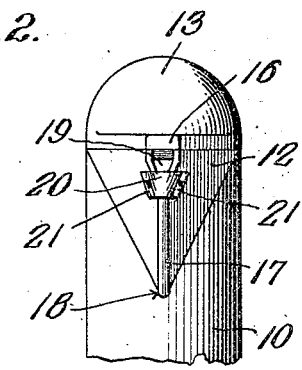
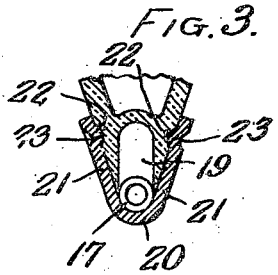
WITNESSES
INVENTOR,
GEORGE W. THOMAS,
BY
ATTORNEY.

UNITED STATES PATENT OFFICE.

GEORGE W. THOMAS, OF CATHLAMET, WASHINGTON, ASSIGNOR TO C. H. THOMAS AND LAURA A. THOMAS.

PITCHER OR DISPENSING VESSEL.

1,279,787.  Specification of Letters Patent.  Patented Sept. 24, 1918.

Application filed November 9, 1916. Serial No. 130,428.

*To all whom it may concern:*

Be it known that I, GEORGE W. THOMAS, a citizen of the United States, residing at Cathlamet, in the county of Wahkiakum and State of Washington, have invented certain new and useful Improvements in Pitchers or Dispensing Vessels, of which the following is a specification.

My invention relates to a drip returning attachment for pitchers and other dispensing vessels to prevent dripping of contents on to a table; to render the use of a saucer to catch the drip unnecessary as well as frequent washing or wiping of the spout at the mouth, unnecessary.

While I generally aim to provide a novel, improved and more efficient construction to accomplish the end in view, yet I particularly aim to provide an outlet spout shaped to catch dripping liquid and return it through a tube extending into and across the interior of the vessel and terminating close to the wall, and with the tube having a shield of bendable material thereon to facilitate attachment to the spout and to prevent turning and removal of the tube.

With the above and additional objects, such as will hereinafter appear, in view, the invention has been embodied in one preferred form as illustrated in accompanying drawings, wherein:—

Figure 1 is a vertical sectional view of a pitcher having my improvements applied thereto;

Fig. 2 is a fragmentary front elevational view of the pitcher; and—

Fig. 3 is a cross sectional view on the line 3—3 of Fig. 1.

Referring specifically to the drawings, 10 designates a pitcher or dispensing vessel having a handle of any suitable construction at 11 as usual, an outlet spout at 12 and a closure at 13. The closure is hinged to the vessel at 14 and is adapted to be swung on the pivot at 14 through manipulation of the lug 15. The spout 12 is normally closed at the top by means of a wall 16 forming part of the closure 13. As is well known, material in being dispensed from a pitcher will often drip therefrom at the spout, especially after a dispensing action when the material dispensed is a syrup. The dripping material will fall onto the exterior of the pitcher, onto the table, into a saucer provided to catch it. It is also necessary to frequently wash or wipe the exterior of the pitcher. My invention has been particularly devised to overcome the above objections and expedients.

Extending at an angle into the interior of the vessel 10 across the interior and terminating short of the interior wall of the vessel is a pipe 17 which also bears against the lower wall of the spout 12 and extends through an opening 18 in the pitcher which is suitably filled to prevent escape of the contents of the pitcher therethrough. Below the closure 13, the spout 12 on the exterior and at the outlet portion is grooved or cut away at 19 and with this groove or cut away portion 19, one end of the pipe 17 communicates so as to convey dripped material into the pitcher. It will be noted that the base of the groove or cut away portion 19 extends outwardly beyond the upper extremity of the wall of the groove and also that it communicates with the pipe 17 beyond this point. As a result, after a dispensing action, material which may remain at the mouth or spout of the pitcher will flow into the tube or cut away portion 19 and thence through the tube 17 into the pitcher.

A shield 20 preferably of bendable metal is soldered or otherwise fastened to the tube 17 and is disposed to partly surround the groove 19 at the base to insure the passage of dripped material into the tube or pipe. It will be noted that the shield 20 has lateral extremities 21 which clasp or embrace the spout on opposite sides thereof. These portions 21 are bendable and resilient so as to effectively clasp the spout and in addition the spout in opposite side walls is provided with notches 22 into which depressions 23 of the portions 21 removably clip or spring. As a result of this construction, the tube 17 is fastened against removal and also against turning movement.

In use, the pitcher is manipulated in the usual manner to dispense its contents. Due to the fact that the tube 17 extends across the interior of the pitcher and terminates short of the wall thereof, the inner end is not in such a position that the contents of the pitcher will flow therethrough to the exterior. After the desired quantity of material is dispensed, the pitcher is restored to a position at rest and material which may drip from the spout will flow into the groove 19, being guided by shield 20, and thence into the pipe 17 through which it returns, to the interior of the vessel.

Since merely the preferred embodiment of the invention has been illustrated and described, it is to be understood that changes in the details of construction may be resorted to within the spirit and scope of the invention.

I claim:

1. A dispensing vessel having a cut away portion on the exterior thereof, the base wall of said cut away portion extending beyond the outlet of the pitcher to catch matter dripped from the pitcher, and detachable conveying means leading from the cut away portions to return the dripped matter to the interior of the pitcher, said conveying means being adapted to be detached from without the cut away portion.

2. A dispensing vessel having a cut away portion on the exterior, the base wall of said cut away portion extending beyond the outlet of the vessel to catch matter dripped therefrom, a tube extending interiorly of the pitcher to return the dripped matter to the interior of the pitcher, said tube communicating with said cut away portion, and a shield coöperating with the tube and partly extending across the cut away portion, said shield being adapted to be secured to the exterior of said vessel.

3. A dispensing vessel having a spout provided with a groove on the exterior to catch matter dripped from the vessel, a tube extending interiorly of the vessel resting against the spout and communicating with said groove to return dripped material to the interior of the pitcher, a clasp carried by the tube, said clasp having portions engaging opposite sides of the spout, said spout having a recess and said clasp having a depression to clip into said recess to secure the tube thereagainst detachment and against turning movement.

4. A dispensing vessel having a cut away portion on the exterior to catch matter dripped therefrom, a tube leading from said portion interiorly of the pitcher to return dripped matter thereto, and means for embracing the tube to detachably engage the pitcher adjacent the cut away portion to fasten the tube in place and prevent turning movement thereof.

5. A dispensing vessel having a tube associated with the outlet thereof to catch dripped matter and return it to the interior of the pitcher, said tube extending interiorly of the pitcher across the interior and terminating short of the wall thereof, and a resilient shield for detachably engaging the pitcher adjacent the outlet of the tube.

In testimony whereof I affix my signature in presence of two witnesses.

GEORGE W. THOMAS.

Witnesses:
C. H. THOMAS,
M. GORMAN.